Feb. 4, 1958  J. L. HOLLIS  2,822,027
METHOD OF ASSEMBLING AN ELASTIC BAND UPON A TIRE BODY
Filed Feb. 28, 1955  2 Sheets-Sheet 1
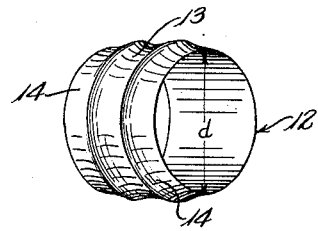
FIG-1
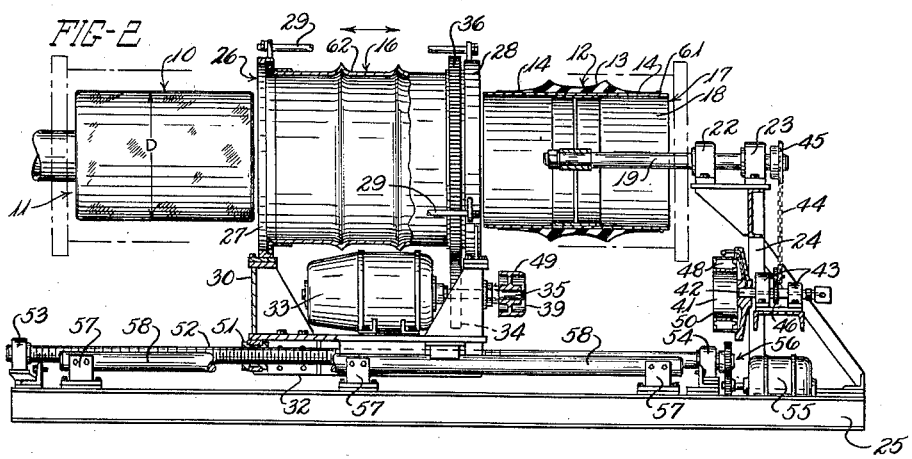
FIG-2
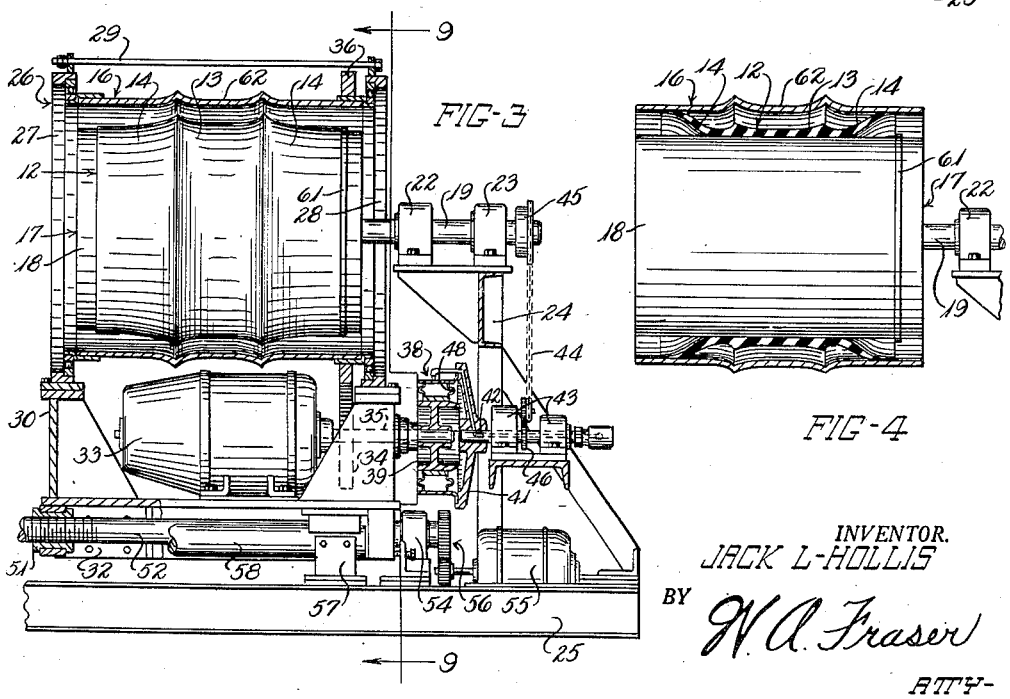
FIG-3
FIG-4
INVENTOR.
JACK L. HOLLIS
BY
W. A. Fraser
ATTY- Feb. 4, 1958    J. L. HOLLIS    2,822,027
METHOD OF ASSEMBLING AN ELASTIC BAND UPON A TIRE BODY
Filed Feb. 28, 1955    2 Sheets-Sheet 2
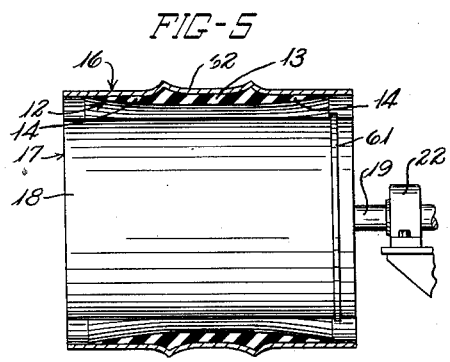
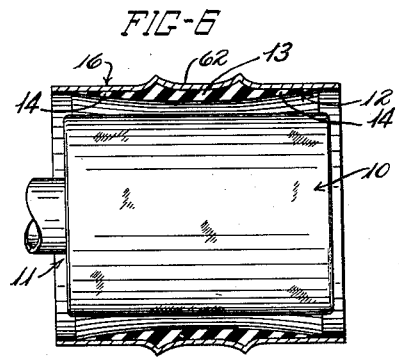
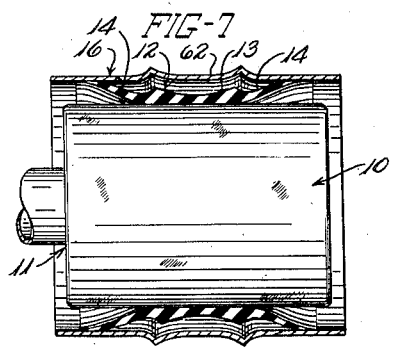
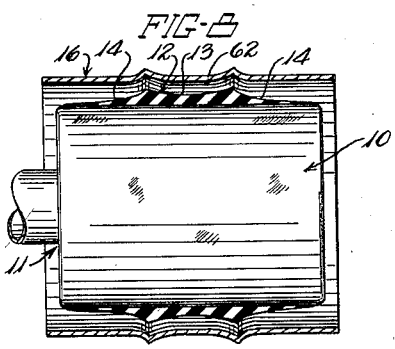
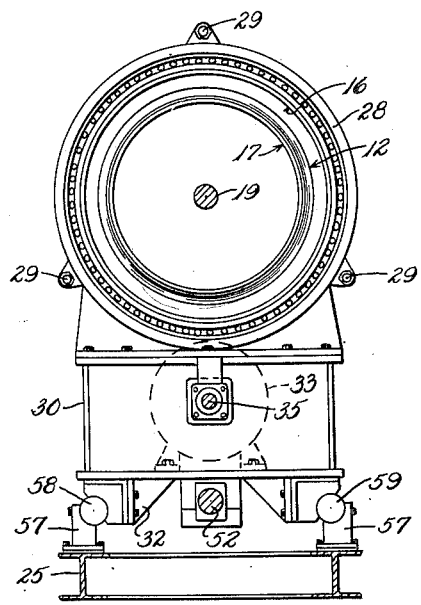
INVENTOR.
JACK L. HOLLIS
BY W. A. Fraser
ATTY.

United States Patent Office 2,822,027
Patented Feb. 4, 1958

2,822,027

METHOD OF ASSEMBLING AN ELASTIC BAND UPON A TIRE BODY

Jack L. Hollis, Akron, Ohio, assignor to The Firestone Tire & Rubber Company, Akron, Ohio, a corporation of Ohio Application February 28, 1955, Serial No. 490,856

1 Claim. (Cl. 154—14)

This invention relates to the manufacture of pneumatic tires and more particularly to an apparatus and method for assembling the tread and body portions of a tire.

As automobile suspensions have improved and automobile motors become quieter in operation, drivers have become increasingly aware, and critical, of the ride and noise characteristics of tires. Many drivers are annoyed by the so-called "thumping" tires, which produce a periodic, low-frequency vibration, a vibration which in most cases is felt but which at times is audible as well. A thumping tire will often result from a non-uniform tread gauge, although, of course, other defects in construction have been recognized as contributing to thump. Such an off-gauge tread is inherent in conventional methods of applying tread portions to tire bodies in which portions of the tread are stretched while other portions of the same tread are compressed upon the tire body to produce variations in tread thickness. The subsequent molding and vulcanizing operations used to finish the tire will not correct this non-uniform distribution of tread mass which is introduced by such manufacturing methods and if the condition is severe enough the final tire will have an unsatisfactory ride.

The conventional methods of assembling treads with tires, in addition to their lack of control over tread gauge, have other objections. In the production of passenger tires, such methods are time consuming and expensive; the operations are difficult and require manual strength and dexterity. It is difficult to achieve uniformity of results so far as tire performance is concerned.

The present invention obviates these difficulties in the prior methods of building tires by providing a novel and improved method of applying a tread to a tire body. In brief, the method comprises the steps of spinning a tread and sidewall portion of a tire in the form of a closed cylinder at high speeds causing it to expand elastically to a circumference slightly greater than that of the tire body, supporting the expanded tread externally with a supporting sleeve, bringing the spinning tread and supporting sleeve into telescoping position encircling a tire body and while the tread is accurately positioned with respect to the tire body, decreasing the rate of spin of the tread allowing it to shrink upon and become firmly assembled with the tire body.

It is accordingly a general object of the invention to provide an improved method and means for assembling a tread with the body of the tire.

A more specific object is to provide a method and means of applying a tread to a tire body comprising enlarging the tread by centrifugal force into contact with an external support, bringing the support and the tread into telescoping position over the body of the tire and then reducing the centrifugal force to shrink the tread uniformly on the body.

Other objects are to provide a pneumatic tire having a tread of uniform gauge, which is well-balanced, smooth running and quiet in operation.

Still other objects are to provide a method of applying a tread to a tire which is virtually automatic in operation, which does not require manual skill, and which provides economies in time and labor.

These and other objects and advantages will be more fully apparent from the following description of a preferred form of the invention, reference being had to the accompanying drawings in which:

Figure 1 is a perspective view of a tread in cylindrical form ready to be applied to a tire body;

Figure 2 is a front elevation of apparatus embodying the invention, showing a tire body supported by a tire assembly drum and showing a tread portion in position on an auxiliary drum ready to be assembled with the tire body;

Figure 3 is an enlarged view of the apparatus of Figure 2 showing an external support moved into telescoping position about the tread portion as it rests on the auxiliary drum;

Figure 4 is a fragmentary view of the apparatus of Figure 3 showing the tread portion being transferred from the auxiliary drum to the external support;

Figure 5 is a view corresponding to Figure 4 showing the tread fully transferred by centrifugal force to the external support;

Figure 6 is a view showing the external support and tread moved axially into telescoping position about the tire body as it is supported on the tire assembly drum;

Figure 7 is a view showing the tread being transferred to the tire building drum;

Figure 8 is a view showing the tread finally assembled on the tire body; and

Figure 9 is a sectional view of the apparatus taken in the plane indicated by the line 9—9 in Figure 3.

The present invention is described in connection with otherwise conventional tire manufacturing processes, in which a plurality of rubber plies are assembled with inextensible beads to form a substantially cylindrical tire body. Such a tire body indicated generally at 10, is shown in Figure 2 in position on a collapsible tire assembly drum 11 which is similar to a conventional building drum. To complete the tire, a tread such as that shown at 12 in Figure 1, is applied to the tire body and united with the body to form an integral structure ready for the final molding and vulcanizing operation. The tread 12, comprises the usual center cap portion 13, which is relatively thick in section and two end portions 14, of lesser thickness which comprise the sidewalls of the finished tire.

The tread 12 is preferably formed in one piece by a transfer-molding operation so that it will be initially uniform in gauge and free of a spliced area. Alternatively, the tread may be formed by splicing the ends of an extruded length of rubber having the proper cross section. In either case, the tread is roughly cylindrical in shape with its inner diameter, $d$, initially about one-half to one inch smaller than the outer diameter, $D$, of the tire body 10. The tread is formed from rubber stocks of conventional and well-known compositions. Such compositions impart considerable elastic properties to the tread and as a result the tread may be stretched circumferentially several inches and upon release of the stretching forces will return to its original circumferential length.

As mentioned above, such a tread is assembled upon the tire body by spinning the tread at a relatively high speed, so that the centrifugal forces exerted upon the tread will stretch the tread into close contact with an external supporting sleeve, indicated generally at 16, the tread in this condition having a diameter slightly exceeding that of the tire body. The external sleeve and the temporarily enlarged tread are then brought into telescoping position about the body of the tire. The elongation of the tread under the centrifugal forces of spinning is substantially elastic, so that once the tread is properly positioned with respect to the tire body a reduction in the rate of spin will cause the tread to shrink back toward its original circumferential length and close tightly upon the tire body. By such a method every portion of the tire tread is subjected to the same centrifugal forces and the tread accordingly retains its original uniformity of gauge throughout the operation.

Apparatus for imparting spin to the tread and for carrying the spinning tread into telescoping position about the tire body comprises in addition to the supporting sleeve 16, an auxiliary drum 17 positioned substantially coaxial with and slightly spaced from the tire assembly drum 11, as shown in Figure 2. The auxiliary drum 17 has the general function of receiving the tread of the tire and imparting sufficient spin to the tread to transfer it to the external sleeve 16. The drum comprises a cylindrical body 18 mounted in cantilever fashion on a shaft 19 which is supported in suitable bearings indicated at 22 and 23, the bearings being mounted on a column 24 fixed to the base 25 of the apparatus. The cylindrical body 18 of the auxiliary drum preferably has a diameter enabling it to receive the tread 12 with a reasonably snug fit. The drum and shaft may be driven at the desired speed by any suitable means but as will be described in detail later it is preferably driven by the same means which drives the external sleeve 16.

The external sleeve 16 is journaled for rotation in a cage indicated generally at 26 which comprises a pair of large ring bearing members 27 and 28 at the ends of the cage which are connected by a plurality of longitudinal tie rods 29. The cage 26 is supported by suitable supporting members 30 mounted on a carriage indicated generally at 32. The sleeve 16 is rotated within the cage by an electric motor 33 also mounted on the carriage, the motor driving the sleeve by the small gear 34 mounted on the shaft 35 of the motor and meshing with a large ring gear 36 encircling and fixed upon the sleeve 16 as shown. This arrangement permits the sleeve to be rotated while the carriage is simultaneously moved longitudinally.

In order to drive the auxiliary drum 17 at the same speed of rotation as the supporting sleeve 16 the motor 33 which drives the sleeve is also connected by a suitable transmission to the auxiliary drum. Any variations in the motor speed will thus act with equal effect on both the sleeve and the auxiliary drum and the two will always maintain the same speed. Accordingly the motor shaft 35 is extended rightwardly beyond the carriage to connect with a penumatic clutch 38 which is conventional in construction and which need not be described in detail.

It is sufficient to note that the clutch comprises an inner hub member 39 fixed to the motor shaft which has driving connection with an outer clutch member 41 which in turn is fixed upon a shaft 42 journaled in bearings 43 and supported by the column 24. The auxiliary drum 17 is driven by a chain and sprocket arrangement comprising a chain 44 and a pair of sprockets 45 and 46 mounted on the drum shaft 19 and shaft 42 respectively. The clutch members 39 and 41 are engaged by inflating an expansible tube 48 which brings the frictional parts 49 and 50 of the clutch members into contact with each other and the clutch is disengaged by deflating the tube and thereby separating the frictional parts.

The carriage 32 is supported by and moved back and forth between the auxiliary drum 17 and the tire assembly drum 11 by means of a threaded nut 51 at the base of the carriage which engages a longitudinally extending threaded bar 52. The bar is journaled for rotation in suitable bearings 53 and 54 and is rotated by an electric motor 55 through a suitable gear train indicated generally at 56. When the threaded shaft is rotated by the motor in one direction the threaded engagement between the nut and the shaft will move the carriage and the external sleeve into telescoping position about the tire assembly drum 11 and when the motor is reversed to turn the shaft in the opposite direction the cage and external sleeve will be moved into telescoping position about the auxiliary drum 17. The carriage is further supported by suitable block members 57 which rest upon and slide along a pair of longitudinal ways 58 and 59.

At the beginning of an operating cycle the carriage is moved over to the left a sufficient amount to enable a tread to be fitted onto the auxiliary drum. With the carriage in this position the clutch 38 is disengaged and the auxiliary drum 17 is stationary. The tread is accurately positioned upon the drum by bringing its right hand edge flush against a slight radial flange 61 on the surface of the drum. The carriage is then moved to the right, by operation of motor 55 and the threaded shaft 52, to take a telescoping position about the drum and tread, see Figure 3. When this position is reached, the clutch members 39 and 41 are engaged by inflating the tube 48 and the motor 33 is started to drive the auxiliary drum and the external sleeve at a speed preferably in the order of about 500 to 600 R. P. M. As soon as the drum 17 imparts an appreciable rotation to the tread, centrifugal force throws the sidewall portions 14 of the tread outward into contact with the external sleeve 16, see Figure 4, and as the tread picks up rotational speed, the tread is progressively transferred by centrifugal force into full contact with the outer sleeve, see Figure 5. Preferably the outer sleeve has a concave channel 62 which receives the thickened portion 13 of the tread and which locates the tread accurately within the sleeve. The rate of spin should be sufficiently high to elongate the tread circumferentially about 4–5 inches, an amount which brings the tread well clear of the auxiliary drum and which enables it to be moved easily over the tire body without contacting it.

As soon as the tread is completely transferred to the external sleeve 16, the clutch 38 is disengaged and the carriage is moved leftwardly to carry the sleeve into telescoping position over the tire assembly drum 11 which in the meantime has received an assembled tire body 10 and which is itself spinning at the rate of about 300 R. P. M., see Figure 6. While this carriage movement takes place the motor 33 continues to rotate sleeve 16 and the tread 12 at a speed which ensures that the tread will remain in full contact with the sleeve.

As soon as the tread is properly positioned axially with respect to the tire assembly drum 11 and the tire body 10 which is mounted thereon, the spin of the tread is reduced by reducing the speed of the motor 33 and the tread quickly contracts upon the tire body, see Figures 7 and 8. Since as mentioned above, the tread initially has a diameter smaller than the diameter of the tire body, and since the tread has a tendency to return to this original diameter as soon as the centrifugal force is reduced, the tread accordingly shrinks tightly upon the tire body and a good bond between the tread and the body results.

As soon as the tread is clear of sleeve 16, the carriage is moved to the right to clear the way for suitable stitchers (not shown) to operate upon the tread and to force it into a tight union with the tire body. The tire assembly drum 11, is then collapsed and the completed tire is removed, ready for the vulcanizing operation. A new tire body is placed upon the collapsed drum and the drum is expanded to support the tire for the next assembly operation.

Various changes and modifications in the apparatus and method described herein will no doubt occur to those skilled in the art without departing from the spirit and scope of the invention, the essential features of which are summarized in the appended claim.

I claim:

The method of assembling an elastic band upon a tire body, comprising forming said band into substantially cylindrical form with an inner diameter smaller than the outer diameter of said tire body, supporting the entire radially inner cylindrical peripheral surface of said band upon an auxiliary drum, spinning said band about its longitudinal axis to expand it uniformly radially from said drum to an indexed position against the inner peripheral surface of a sleeve solely by the application of centrifugal force, terminating said expansion when said band contacts said surface of said sleeve, spinning said tire body about its longitudinal axis at a rate equal to that of said spinning band, telescoping said band to a second indexed position over said tire body, and contracting said band upon said tire body.

References Cited in the file of this patent

UNITED STATES PATENTS 2,517,889     Kuffler  ---------------- Aug. 8, 1950